United States Patent [19]
Otsuka

[11] 3,725,854
[45] Apr. 3, 1973

[54] SYSTEM FOR DETECTING MOTION OF A NEARBY TARGET BY CONTINUOUS ULTRASONIC WAVES

[75] Inventor: Kozo Otsuka, Tokyo, Japan

[73] Assignee: Toitsu Kogyo Kabushiki Kaisha, Yokohama, Japan

[22] Filed: June 12, 1970

[21] Appl. No.: 45,764

Related U.S. Application Data

[63] Continuation-in-part of Ser. No. 768,261, Oct. 17, 1968, abandoned.

[30] Foreign Application Priority Data

May 2, 1968 Japan ............................. 43/29642

[52] U.S. Cl. .............. 340/1 R, 340/3 D, 340/258 A, 343/5 PD
[51] Int. Cl. ............................................. G01s 9/66

[58] Field of Search ........... 340/1 R, 3 R, 3 D, 258 A; 343/5 PD, 7.7

[56] References Cited

UNITED STATES PATENTS 2,826,753   3/1958   Chapin .............................. 340/3 D
3,585,577   6/1971   Rollwitz ............................. 340/3 D Primary Examiner—Richard A. Farley
Attorney—Stevens, Davis, Miller and Mosher

[57] ABSTRACT

A system for detecting motion of a nearby target by continuous ultrasonic waves comprising an ultrasonic wave resonator, synchronized with a continuous wave generator, and means for detecting a minute change in the radiation impedance of said ultrasonic wave resonator.

4 Claims, 5 Drawing Figures

PATENTED APR 3 1973 3,725,854

INVENTOR
KOZO OTSUKA

BY *Stevens, Davis, Miller & Mosher*
ATTORNEYS

SYSTEM FOR DETECTING MOTION OF A NEARBY TARGET BY CONTINUOUS ULTRASONIC WAVES

CROSS REFERENCE TO RELATED APPLICATION

This is a continuation in part of U.S. Patent application Ser. No. 768,261, filed Oct. 17, 1968, now abandoned.

The present invention relates to a system for detecting motion of a nearby target by continuous ultrasonic waves.

In the so-called Doppler method of detecting motion of a nearby target by ultrasonic waves, ultrasonic waves are applied to a nearby target by means of an ultrasonic wave transmitter and part of the waves reflected by the target, which are subjected to the Doppler effect due to relative motion between the transmitter and the target, is received by means of a suitable ultrasonic wave receiver. The reflected waves which are thus received are then compared with the transmitted waves to detect beats of low frequency proportional to the velocity of motion of the reflecting surface of the target.

Said target indicates a moving body on which surface the ultrasonic waves are reflected, refracted and attenuated, and varying medium through which the ultrasonic waves are reflected, refracted, attenuated, and interfered by inhomogeneity of the said medium.

Let the frequency of the beats detected be $f$, the ultrasonic wave input direction component of the velocity of relative motion of the reflecting surface be $v$, and the propagation wavelength of the ultrasonic waves be $\lambda$, and the following relation will hold:

$$f = (2v)/\lambda \quad (1)$$

The propagation wavelength of an ultrasonic waves being propagated in a homogeneous and inhomogeneous medium, i.e., air, water and biological body is determined by the frequency of the ultrasonic waves employed. Thus, the phase of reflected waves may vary depending on motion or vibration of the reflecting surface.

If the frequency of beats produced by the Doppler effect due to motion or vibration of the reflecting surface of a target is measured, it will be possible to detect motion or vibration of the target without directly contacting the target or in cases where it is impossible to directly contact the target.

Methods known in the art of detecting such motion or vibration essentially relay on the Doppler effect involving transmitted waves and reflected waves, and require the use of an ultrasonic wave transmitter and an ultrasonic wave receiver. The ultrasonic wave receiver generally adopts a heterodyne system which uses the frequency or transmitted waves as a local oscillating frequency.

Apparatus for carrying the aforementioned method of the prior art into practice have hitherto required two ultrasonic wave vibrators each for transmission and reception. In addition, such apparatus involve complicated circuits which are hard to adjust. Attempts to obtain an overall compact size and a reduced weight in such apparatus in order to reduce costs have hitherto been unsuccessful because the small type apparatus have many disadvantages.

An object of the present invention is to provide a system for detecting motion of a nearby target by means of an ultrasonic wave generator which uses only one ultrasonic wave vibrator, instead of separate vibrators for transmission and reception.

Another object of the invention is to provide a system for detecting motion of a nearby target by taking out, as mentioned later, a minute change in the radiation impedance of the ultrasonic wave resonator itself due to the disturbed ultrasonic field, as a minute change of the frequency, voltage and current in the circuit of the said synchronous oscillator which is synchronized with the said ultrasonic wave resonator. Such minute change in the radiation impedance of the resonator is caused by reflected waves of ultrasonic radiation waves emitted by said ultrasonic wave resonator.

Other objects and advantages of the present invention will become apparent after the description hereafter set forth is considered in conjunction with the drawing annexed hereto, in which.

Figure 1:
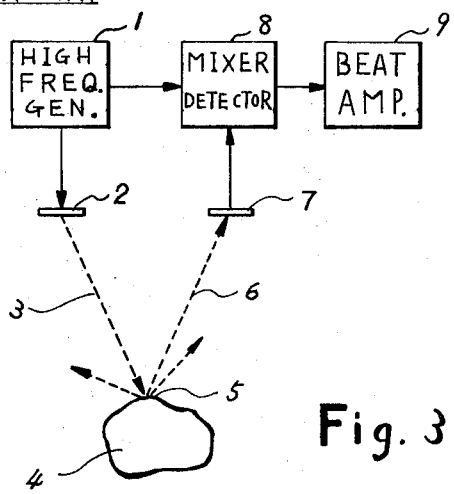
FIG. 1 is a view in explanation of a system for detecting motion of a nearby target by the Doppler method of the prior art.

In a known system for detecting motion of a nearby target by the Doppler method shown in FIG. 1, an ultrasonic wave beam radiation 3 emitted by an ultrasonic wave vibrator 2 for transmission as the latter is excited by a high frequency generator 1 is applied to a reflecting surface 5 of a target 4. A part 6 of the waves reflected by the reflecting surface reaches an ultrasonic wave vibrator 7 for reception. Doppler beats produced by a mixer detector 8 by using the frequency of said high frequency generator 1 for driving said ultrasonic wave vibrator for transmission 2 as a local oscillating frequency are detected and amplified by a beat amplifier 9.

A system for detecting motion of a nearby target by ultrasonic waves embodying the present invention includes an ultrasonic wave transmitter receiver using one ultrasonic wave vibrator for transmission and reception.

Figure 2:
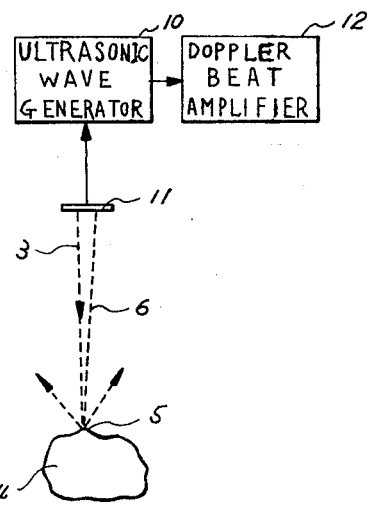
FIG. 2 is a view in explanation of a system for detecting motion of a nearby target by continuous ultrasonic waves according to the present invention.

In the present invention, continuous ultrasonic radiation waves are emitted by an ultrasonic wave resonator 11 continuously driven or excited by an ultrasonic wave generator 10 as shown in FIG. 2. A beam of continuous ultrasonic waves 3 is applied to a reflecting surface 5 of a target 4 and part of the waves reflected thereby reaches said ultrasonic wave resonator 11.

In the free and unobstructed space, the radiation energy of emitted ultrasonic waves never returns back.

However, when there exists a reflector, part of the ultrasonic waves is scattered on and reflected by its reflecting surface, thereby deforming and disturbing the original ultrasonic wave field. In other words, the existence of the reflector produces the same effect as superimposing another ultrasonic wave field over the ultrasonic wave field in the free and unobstructed space.

The presence of an ultrasonic wave field superimposed over the other ultrasonic wave field causes a change in the radiation impedance of the ultrasonic wave resonator 11. Accordingly, if the reflecting surface of the reflector moves relative to the ultrasonic wave resonator 11, said radiation impedance will show a periodic change. The periodic change has a very low frequency as compared with the resonant frequency of the ultrasonic wave resonator which synchronized with the synchronous oscillator 10. The frequency of the periodic change is determined not only by the velocity of relative motion of the reflecting surface, but also by the inhomogeneity in the medium along the reflecting ultrasonic wave path. Therefore, the changes of the radiation impedance are very complicated especially when the medium of the propagation path is inhomogeneous. Then, the changes in the synchronous oscillator circuit are also complicated according to the changes of the radiation impedance.

Such phenomenon represents an influence exerted by the reflected waves on the ultrasonic wave resonator 11, and accordingly, also on the synchronous oscillator 10 which is synchronized by the ultrasonic wave resonator 11. The phenomenon which causes a change in the synchronous oscillator 10 manifests itself as a periodic change of the frequency, voltage and current in the synchronous oscillator circuit.

Such phenomenon represents an influence exerted by the reflected waves on the exciting circuit for the ultrasonic wave resonator. The phenomenon which causes a change in the radiation impedance of the ultrasonic wave resonator manifests itself as a periodic change of the radiation impedance.

If the distance between the ultrasonic wave vibrator and the reflecting surface varies, then the phase difference will naturally show a relative change. It is thus possible to detect a change in phase difference between the transmitted waves and the reflected waves on the ultrasonic wave resonator side. When the reflecting surface moves toward the ultrasonic wave resonator, a change in phase difference manifests itself as an increase in the frequency of reflected waves; when the reflecting surface moves away from the ultrasonic wave resonator, a change in phase difference manifests itself as a reduction in the frequency of reflected waves.

The frequency of reflected waves is equal to the frequency of transmitted waves plus the product obtained by multiplying by two the quotient obtained by dividing the relative velocity of the reflecting surface by the wavelength, and accordingly the difference in frequency between the transmitted waves and the reflected waves is equal to the product obtained by multiplying by two the quotient obtained by dividing the relative speed by the wavelength.

The beat frequency component or Doppler beat frequency component of such difference in frequency causes a change to occur in radiation impedance of ultrasonic resonator and hence a minute change to occur in current or voltage in the driving oscillator as a minute change of its load impedance. It is thus possible to obtain information on the manner of motion of the reflector by detecting such change.

When the medium along the reflecting ultrasonic wave path is inhomogeneous, the phenomenon of reflection, refraction and attenuation occur at the boundary of inhomogeneity. Then, the phenomenon which causes a change in the synchronous oscillator 10 manifests itself as a change of the frequency, voltage and current in the synchronous oscillator circuit. These phenomenon are independent of said Doppler effect substantially, but the phenomenon occurring in the synchronous oscillator circuit are similar to the phenomenon occuring in its circuit by Doppler effect. Since this change of frequency, voltage and current are very minute in magnitude, it is required to provide means whereby only the changed component can be taken out by excluding parasitic noises or jamming noises in order to detect the change only.

In the present invention, the drive synchronous oscillator for exciting or driving the ultrasonic resonator 11 for transmission and a Doppler beat amplifier 12 for detecting a minute change detected in the circuit are designed such that the overall detection sensitivity of such components can be maximized.

Even if the generator has a small capacity, it is possible to make up for a lack in overall detection sensitivity by increasing the gain of the Doppler beat amplifier. By using the drive oscillator of small capacity, it is possible to provide improvement in signal to noise ratio without proportionally reducing noise voltage in the output of Doppler beat amplifier. The overall detection sensitivity is determined by the absolute value of a change in detected voltage or current corresponding to a change in ultrasonic wave radiation impedance that is, a change in load impedance of the drive oscillator.

The basic influence exerted by a motion of the reflecting surface or a minute change in radiation impedance $(dRA)/(RA)$ (where $RA$ is a radiation impedance and $dRA$ is a minute change occurring in the radiation impedance) is converted into a minute change in voltage $dV$ or current in some component of the high frequency oscillator circuit which is sensitive to a load. It is thus possible to detect motion of the reflecting surface by detecting and amplifying $dV$. The overall detection sensitivity can be expressed by the following formula:

$$S = \frac{\frac{dV}{dRA}}{RA} = \frac{dV}{d \log RA} \qquad (2)$$

Generally speaking, the smaller the value of a minute change in voltage $dV$, the lower the noise voltage, resulting in improved signal to noise ratio. It will thus be evident that one of the most important factors that should be taken into consideration in designing a detecting apparatus is to lower the value of an output of the oscillator and increase the gain of the Doppler beat amplifier as much as possible. However, since a reduction in the value of an output of the generator leads to unstable performance, care should be taken in designing a detection apparatus so that good stability in performance may be achieved. Another factor that should be taken into consideration is a distance between the detecting apparatus and the reflector.

Figure 3:
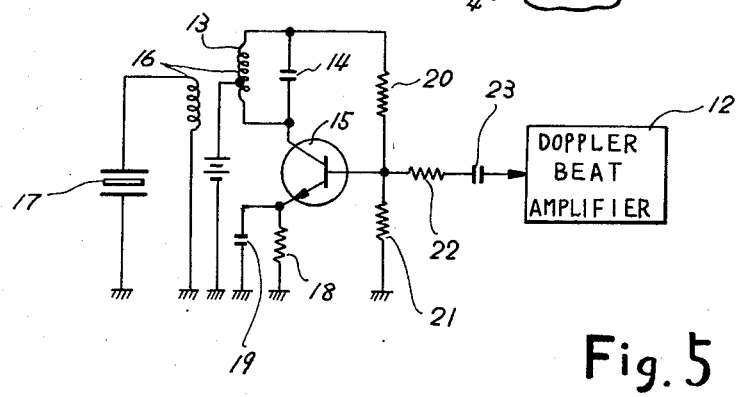
FIG. 3 is a circuit diagram showing one example of ultrasonic wave receiving mechanism used in the system according to the present invention.

FIG. 3 shows one embodiment of the ultrasonic wave transmitter receiver 10 adapted for use with the system of this invention. In the ultrasonic wave transmitter receiver shown, an ultrasonic wave resonator 17 is excited or driven and synchronized by a class C mode or pulsive mode oscillator of the Hartley type comprising an inductance 13, capacitance 14 and transistor 15 through a transformer 16. The values of a resistance 18 and capacitance 19 as well as resistances 20 and 21 are determined such that the aforementioned circuit oscillates in a class C mode or pulsive mode.

When reflected waves reach the ultrasonic wave resonator 17, they are transformed to electric wave vibration, and applied through the transformer 16 to the driving oscillator circuit to synchronize the driving oscillator with the ultrasonic wave resonator. Then, according to this synchronization with the ultrasonic wave resonator, its operating condition of the driving oscillator is changed on its voltage, current and frequency of the driving oscillator. This change of frequency introduces a beat frequency, that is, Doppler beat. Then, this Doppler beats are detected by the base circuit of the transistor 15.

Figure 4:
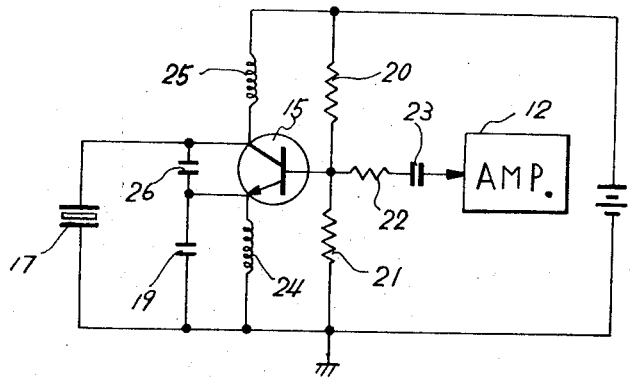
FIG. 4 is a circuit diagram showing the other embodiment of the system according to the invention.
Figure 5:
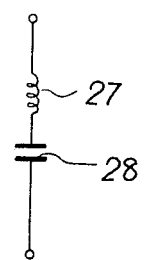
FIG. 5 is an equivalent circuit of the system shown in FIG. 4.

The ultrasonic wave transmitter receiver circuit (FIG. 3) is an example in which circuit, the ultrasonic wave resonator 11 or 17 and the synchronous oscillator 10 are loosely coupled with a transformer 16 and are synchronized with each other. The most important design requirement is independency between the vibration of the ultrasonic wave resonator and the oscillation of the synchronous oscillator, and isolation between them except synchronization action. For this purpose, the synchronous oscillator must be a class C mode or pulsive mode and be loosely coupled with the ultrasonic wave resonator 17 and be independent of various changes of parameters, for example, power supply voltage, temperature, etc. The ultrasonic wave resonator 17 must also be independent of the circuit parameters which are connected to it. For this purpose, the design of transformer 16 is very serious and important. These requirements must be satisfied as able as possible. FIG. 4 is the other example, for this purpose, of the ultrasonic wave transmitter receiver 10 adapted for use with the system of this invention. In the ultrasonic wave transmitter receiver shown, an ultrasonic wave resonator 17 is excited or driven and synchronized by a class C mode or pulsive mode oscillator of the Colpitts type comprising an inductance 24, capacitance 19 and 26, and transistor 15. The equivalent circuit of the ultrasonic wave resonator is a series resonant circuit of an inductance 27 and capacitance 28 (FIG. 5). Then the whole circuit (FIG. 4) comprising with the ultrasonic wave resonator 17 and the Colpitts type oscillator appears as Clapp type oscillator, and is very stable on frequency. If the capacitance 26 and 19 are larger than the equivalent capacitance 28, the resonant frequency of the ultrasonic wave resonator is independent of the other circuit parameters, for example, transistor 15, etc. Therefore, the independency, as mentioned above, is easily obtained by this circuit. The class C mode or pulsive mode operation of the synchronous oscillator is easily obtained by the parallel resonant circuit (comprising with a inductance 24 and a capacitance 19) inserted in the emitter circuit of transistor 15.

The detection system embodying the present invention offers the following advantages over the known method which employs separate ultrasonic wave vibrators 2 and 7 for transmission and reception, respectively.

1. The known method requires the use of at least an ultrasonic wave receiver in addition to an ultrasonic wave generator for transmission. This involves complicated circuits, and accordingly makes it difficult to obtain an overall compact size, reduced weight and reduced costs in a detecting apparatus;

2. The known method requires that the characteristics of two ultrasonic vibrators for transmission and reception be made to agree with each other as much as possible. The present invention obviates this necessity, so that production can be facilitated;

3. In the known method, the area occupied by two ultrasonic wave vibrators is more than twice as large as that in the present invention;

4. In the known method, disagreement in radiation direction characteristics between two ultrasonic wave vibrators for transmission and reception sets limits to the range of operation of the detecting apparatus;

5. The detection system embodying the present invention consists of an ultrasonic resonator for transmission and reception of ultrasonic waves, and a synchronously driving oscillator in which circuits, voltages, currents and beat frequency are changed according to the changes of its load impedance, i.e., the radiation impedance of the ultrasonic resonator; and 6. The detection system embodying the present invention permits to obtain an overall compact size, reduced weight and reduced costs in a detection apparatus.

What is claimed is:

1. A system for detecting motion of a nearby target by continuous ultrasonic waves comprising a continuous wave synchronous oscillator, an ultrasonic wave resonator excited by said oscillator synchronously, and means for detecting a minute change in the radiation impedance itself of said ultrasonic wave resonator caused by reflected waves of ultrasonic waves radiated by said resonator.

2. A system for detecting motion of a nearby target by continuous ultrasonic waves as defined in claim 1, wherein said minute change is a change in at least one of the voltage, current and frequency in said synchronous oscillator circuit.

3. A system for detecting motion of a nearby target by continuous ultrasonic waves as defined in claim 1, in which the output of said synchronous oscillator is relatively small and said synchronous oscillator is loosely coupled with said ultrasonic resonator.

4. A system for detecting motion of a nearby target by continuous ultrasonic waves as defined in claim 1, comprising an ultrasonic resonator for transmission and reception of ultrasonic waves, and a synchronous oscillator which is synchronized with the said ultrasonic resonator and synchronizes the said ultrasonic resonator and said oscillator with each other.

* * * * *